(12) United States Patent
Alexander (10) Patent No.: US 11,651,453 B2
(45) Date of Patent: May 16, 2023

(54) ENHANCED STATUS NOTIFICATION AND OUTAGE DETECTION SYSTEMS AND METHODS FOR ELECTRIC UTILITY NETWORKS

(71) Applicant: EATON INTELLIGENT POWER LIMITED, Dublin (IE)

(72) Inventor: Roger Kirk Alexander, Rockville, MD (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 750 days.

(21) Appl. No.: 16/655,704

(22) Filed: Oct. 17, 2019

(65) Prior Publication Data

US 2020/0128502 A1 Apr. 23, 2020

Related U.S. Application Data

(60) Provisional application No. 62/747,825, filed on Oct. 19, 2018.

(51) Int. Cl.
| | | |
|---|---|---|
| *H04W 56/00* | (2009.01) | |
| *G06Q 50/06* | (2012.01) | |
| *H04Q 9/00* | (2006.01) | |
| *H02J 13/00* | (2006.01) | |

(52) U.S. Cl.
CPC ........ *H04W 56/0015* (2013.01); *G06Q 50/06* (2013.01); *H02J 13/0075* (2013.01); *H02J 13/0079* (2013.01); *H04Q 9/00* (2013.01); *H04Q 2209/25* (2013.01); *H04Q 2209/60* (2013.01)

(58) Field of Classification Search
CPC ................ H04W 56/0015; G06Q 50/06; H02J 13/0075; H02J 13/0079; H02J 13/00002; H02J 13/00022; H04Q 9/00; H04Q 2209/25; H04Q 2209/60; H04Q 2209/40; Y02E 60/00; Y02E 60/7853; Y04S 10/30; Y04S 40/126

See application file for complete search history.

(56) References Cited

U.S. PATENT DOCUMENTS

| | | | |
|---|---|---|---|
| 5,959,969 | A | 9/1999 | Croslin et al. |
| 6,137,868 | A | 10/2000 | Leach |
| 7,308,370 | B2 | 12/2007 | Mason, Jr. et al. |
| 7,586,420 | B2 | 9/2009 | Fischer et al. |

(Continued)

*Primary Examiner* — Abdullahi Ahmed
(74) *Attorney, Agent, or Firm* — Eckert Seamans Cherin & Mellott, LLC (57) ABSTRACT

A mesh network includes a plurality of nodes and a network head. The plurality of nodes includes a first node structured to generate and output a message to the network head in response to an event. The message includes at least one first information item associated with the first node, the electrical device monitored by the first node, or the section of the electrical distribution system monitored by the first node. The plurality of nodes includes a second node disposed on a communication path between the first node and the network head and being structured to add at least one second information item associated with the second node, the electrical device monitored by the second node, or the section of the electrical distribution system monitored by the second node to the message and to output the message to the network head.

18 Claims, 3 Drawing Sheets

(56) References Cited

U.S. PATENT DOCUMENTS

| | | | |
|---|---|---|---|
| 7,830,874 B2 | 11/2010 | Cornwall et al. | |
| 10,292,060 B2 | 5/2019 | Alexander | |
| 2007/0183318 A1 | 8/2007 | Johnson et al. | |
| 2007/0183369 A1 | 8/2007 | Angelis | |
| 2008/0068217 A1 | 3/2008 | Van Wyk et al. | |
| 2009/0135018 A1 | 5/2009 | Veillette et al. | |
| 2009/0138777 A1 | 5/2009 | Veillette | |
| 2009/0187285 A1 | 7/2009 | Yaney et al. | |
| 2009/0245094 A1 | 10/2009 | Russell et al. | |
| 2009/0262642 A1 | 10/2009 | van Greunen et al. | |
| 2009/0274052 A1 | 11/2009 | Howarter et al. | |
| 2011/0221603 A1 | 9/2011 | Deaver, Sr. et al. | |
| 2013/0094430 A1* | 4/2013 | Mills | H04W 52/02 370/315 |
| 2013/0173243 A1* | 7/2013 | Kayton | G08C 15/00 703/13 |
| 2014/0085105 A1* | 3/2014 | Vaswani | G01D 4/02 340/870.11 |
| 2014/0146678 A1* | 5/2014 | Merlin | H04W 68/025 370/235 |
| 2018/0109966 A1* | 4/2018 | Alexander | H04W 24/04 |

\* cited by examiner

ENHANCED STATUS NOTIFICATION AND OUTAGE DETECTION SYSTEMS AND METHODS FOR ELECTRIC UTILITY NETWORKS

CROSS-REFERENCE TO RELATED APPLICATION

This application claims priority from U.S. Provisional Patent Application Ser. No. 62/747,825, filed Oct. 19, 2018, entitled "ENHANCED NOTIFICATION AND DETECTION SYSTEMS AND METHOD FOR ELECTRIC UTILITY NETWORKS", the contents of which are incorporated herein by reference.

BACKGROUND

Field

The disclosed concept generally relates to mesh network communication system for an electric utility network. More particularly, the disclosed concept relates to outage reporting using a mesh network communication system for an electric utility network.

Background Information

Electric utility networks are generally composed of electric power providers such as power plants and a grid of power lines and other electric distribution equipment that provides power to various consumers. Monitoring equipment such as meters are dispersed throughout the network. A central management system will accumulate information from the meters to provide overall monitoring of the utility network.

Electric utility networks are susceptible to outages due to various factors. Meters are generally powered by the utility network so an outage can impede the ability of the meters to communicate outages to the central management system. It can be difficult to pinpoint the location or extent of an outage.

A wireless mesh network is a communications network configured to route data between nodes (e.g., communication devices or wireless communication circuitry) within the network where nodes can make use of links between multiple alternative neighbors for routing traffic across the network. Mesh networks provide reliable network communications by taking advantage of diverse link connectivity between nodes to establish optimal end-to-end paths between different source and destination points within the network. Through the use of dynamic routing protocols mesh networks are able to support continuous connectivity by adapting to changes in the availability of link connectivity between nodes.

A wireless mesh network is able to provide complete connectivity among nodes by allowing for multi-hop communications whereby a message between an originating source node and the intended destination node or other device can be sent through multiple intermediate nodes. The mesh network can be self-healing based on the ability to use diverse neighbor link connections to overcome individual link or node failures.

In a frequency hopping wireless mesh network the communications between connected neighbor node take place over a series of radio frequency (RF) channels where the nodes following an initial synchronization phase communicate by transmitting and receiving communications using a pseudorandom sequence of frequencies.

In the utilities industry, mesh networks have been used to support the monitoring and control of various critical resources, such as electricity. In a "smart" electrical grid, for instance, various system devices (e.g., meters, transformers, other line sensor devices, etc.) are equipped with or associated with wireless communications device circuitry that functions as a node and allows for information exchange and remote access and control. This allows the system devices to be wirelessly connected and able to communicate with a network head (e.g., a head end system, a gateway, etc.), one another, and various other nodes over a radio frequency medium. The nodes act as part of a wireless mesh network supporting data relaying between devices as necessary for delivering information from an originating source to the intended destination, often a destination network head, which facilitates the interfacing of the system device with information or application servers, other networks, etc. Persons of ordinary skill in the art will recognize that smart grids usually include systems in which devices in the mesh network are connected to, and relies upon, the electrical grid as a primary source of power by being connected to electric feeder lines.

Typically, in a multi-hop wireless mesh network, an initiating node wishing to transmit data to a destination network head may initiate a connection through an intermediate device assessed to be the best "next hop" node for routing towards the gateway. The identity of the intermediate node is determined from internal routing tables that may be dynamically (reactively) or proactively updated through the routing exchanges among neighboring nodes. In a frequency hopping wireless network the connection establishment may require an initial synchronization phase between the nodes. After the initiating node has synchronized with the intermediate next hop node, the two nodes will remain frequency synchronized until the communications that necessitated the connection is facilitated. If the intermediate node has direct connectivity to the destination network head, then it will forward the data from the first node directly to the network head. If the intermediate node is not a direct neighbor to the network head, then the intermediate node will forward the data to another intermediate node that is closer in proximity to the network head, which will then forward the data to another intermediate node, and so on, until the data is ultimately forwarded to the network head. Throughout the mesh network, nodes will initiate these connections with one another so that information can be forwarded to and/or received from a network head or other devices. In addition to supporting connectivity to other nodes in the network, nodes will establish and maintain information on their respective primary connectivity for subsequent communications to the network head, while also exchanging routing information associated with alternative pathways to the network head in the event that the first choice becomes unavailable.

In a utility smart grid system where electrical network devices have associated communications capability, the communications connectivity between devices can be independent of the physical connectivity of the electrical grid, which supplies electrical (mains) power to the devices. For instance, while the nodes may be connected to the electrical grid along separate feeder lines arranged in various configurations, the physical positioning of each node on the electrical grid need not be taken into account as wireless connections are established for optimal radio connectivity.

In the event of a power outage, the node associated with the power outage may output a last gasp message to indicate the power outage. The message will be relayed to the network head, if possible. However, the message is only indicative of the outage of a section of the electrical distribution system associated with the node. The extent of the outage as well as the location within the electrical distribution system at which outage and non-outage sections intersect cannot be determined from the node's message alone.

There is room for improvement in status and outage reporting in electric utility networks, including to provide information redundancy and increased reliability, wider situational awareness, and to support localizing of points of status change within the network.

SUMMARY

These needs and others are met by some example embodiments of the disclosed concept in which a first node of a mesh network is structured to output a message including a first information item to the network head and a second node in a communication path between the first node and the second node is structured to add a second information item to the message.

In accordance with an aspect of the disclosed concept, a mesh network for an electrical distribution system comprises: a plurality of nodes each structured to monitor a corresponding electrical device or section of the electrical distribution system; and a network head, wherein the plurality of nodes includes a first node structured to generate and output a message to the network head in response to an event, wherein the message includes at least one first information item associated with the first node, the electrical device monitored by the first node, or the section of the electrical distribution system monitored by the first node, and wherein the plurality of nodes includes a second node disposed on a communication path between the first node and the network head and being structured to add at least one second information item associated with the second node, the electrical device monitored by the second node, or the section of the electrical distribution system monitored by the second node to the message and to output the message to the network head.

In accordance with another aspect of the disclosed concept, a method of communication using a mesh network for an electrical distribution system comprises: generating a message with a first node of the mesh network in response to an event and outputting the message to a network head of the mesh network, wherein the message includes at least one first information item associated with the first node, an electrical device monitored by the first node, or a section of the electrical distribution system monitored by the first node; receiving the message with a second node of the mesh network disposed on a communication path between the first node and the network head; and adding at least one second information item associated with the second node, an electrical device monitored by the second node, or a section of the electrical distribution system monitored by the second node to the message and outputting the message from the second node to the network head.

In accordance with another aspect of the disclosed concept, a mesh network for an electrical distribution system comprises: a plurality of nodes each being structured to wirelessly communicate with at least one other of the plurality of nodes; and a network head being structured to wirelessly communicate with at least one of the plurality of nodes, wherein the plurality of nodes includes a first node structured to generate and wirelessly communicate a first message to a second node of the plurality of nodes, the first message including a first information item associated with the first node, and wherein the second node is structured to generate and wirelessly communicate a second message to the network head or a third node of the plurality of nodes, the second message including the first information item associated with the first node and a second information item associated with the second node.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Directional phrases used herein, such as, for example, left, right, front, back, top, bottom, and derivatives thereof, related to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that two or more parts are "electrically coupled" or are in "electrical communication" shall mean that two or more parts or components are joined together either directly or joined through one or more intermediate parts such that electricity, current, voltage, and/or energy is operable to flow from one part or component to the other part or component, and vice-versa.

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the singular form of "a", "an", and "the" include plural references unless the context clearly dictates otherwise.

Figure 1:
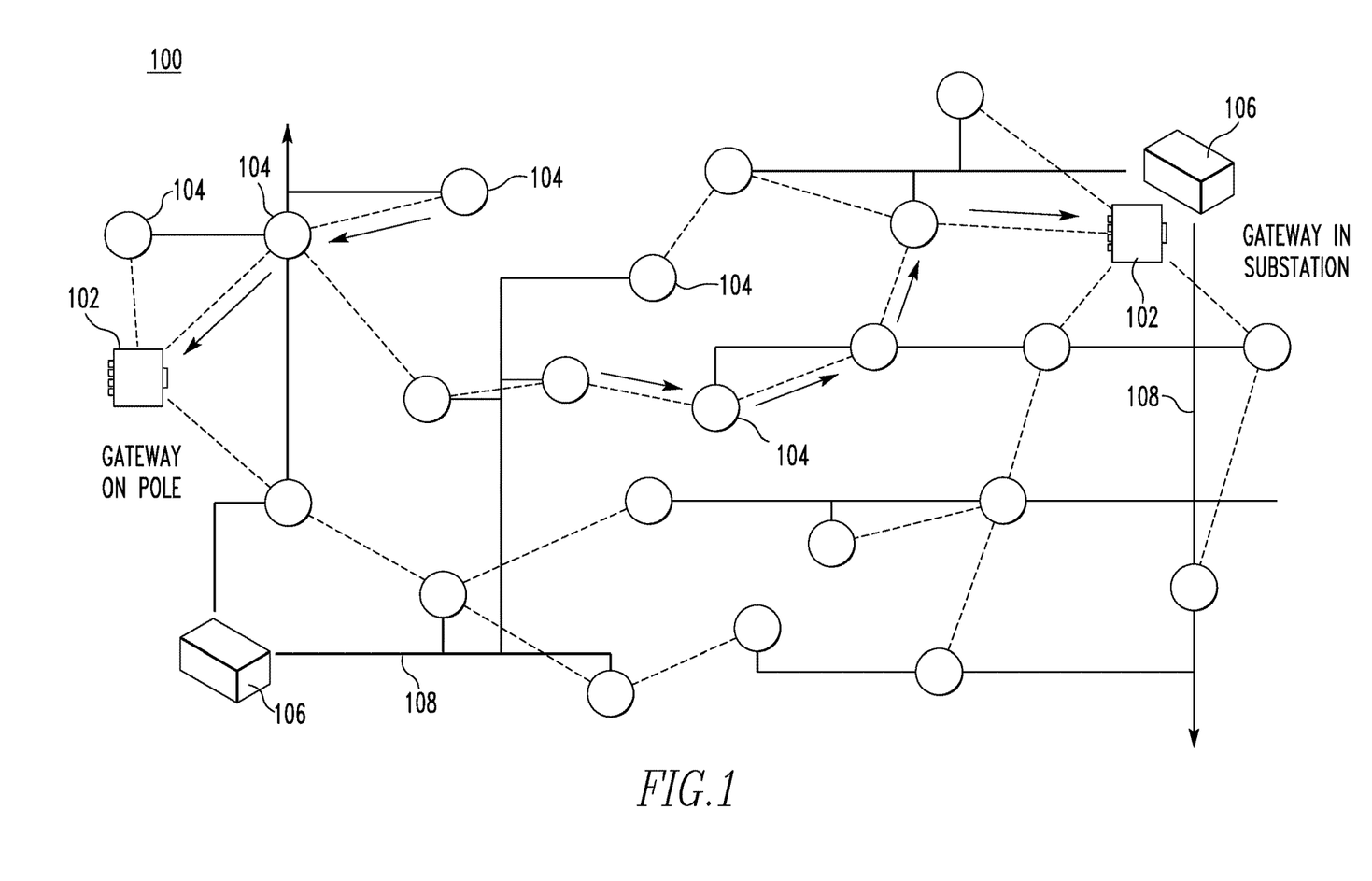
FIG. 1 is a schematic diagram of a mesh network communication system for an electrical distribution system in accordance with an example embodiment of the disclosed concept.

FIG. 1 is a schematic diagram of a mesh network for an electrical distribution system 100 in accordance with an example embodiment of the disclosed concept. The mesh network includes a plurality of nodes 104 and one or more network heads 102 (which can also be referred to as gateways). The nodes 104 may be communication devices capable of wirelessly communicating with each other and the network heads 102. The network heads 102 may be electronic devices that are structured to accumulate information received from the nodes 104. The network heads 102 may also forward the accumulated information on to a central management system or other types of information repositories for the system. When communicating a message to a network head 102, the message may be communicated from the node 104 that originated the message through various intermediate nodes 104 until it reaches the network head 102. The path that the message takes from the originating node to the network head 102 may not be static. That is, the message may take the shortest number of hops between nodes 104 from the originating node 104 to the network head 102 or the message may take a different route through different nodes 104 to the network head 102. If a node 104 is unable to communicate, the message may take a different route through different nodes 104 in order to avoid the disabled node 104. Various techniques may be employed for determining the route of the message between the originating node 104 and the network head 102. For example, in some example embodiments of the disclosed concept, the path of the message may be determined using an anycast path selection process, such as is described in U.S. Patent Application Publication No. 2018/0109966, which is incorporated herein by reference in its entirety. While communication between the originating node 104 and the network head 102 has been described, it will be appreciated that communication between one node 104 and another target node 104 may also be employed without departing from the scope of the disclosed concept.

In some example embodiments of the disclosed concept, an electrical distribution system 100 underlies the mesh network. The electrical distribution system 100 includes various power lines 108 and facilities such as substations 106 for distributing power across the system. The nodes 104 may be associated or incorporated into meters or other devices that monitor the power lines 108 or other components of the electrical distribution system. The nodes 104 may be structured to monitor a corresponding section of the electrical distribution system 100 or a corresponding electrical device that the node is associated with. The nodes 104 are capable of communicating information associated with the electrical distribution system 100. For example, in some example embodiments, the nodes 104 are capable of communicating an outage status of an electrical device the node 104 is associated with (e.g. a meter the node is associated with or included in) or of the section of the electrical distribution system 100 that they monitor. In some example embodiments, other types of information such as voltage levels, power usage, or other characteristics of the electrical distribution system 100 may be communicated by the nodes 104. The nodes 104 may also be structured to communicate information associated with themselves, such as identification information. The communication path between nodes 104 does not necessarily follow the power lines 108. For example, the nodes 104 may communicate wirelessly with each other. A node 104 and its next closest node 104 may be on different branches of the electrical distribution system 100.

In some example embodiments, one or more of the nodes 104 are structured to output a message to the network head 102 in response to an event such as detecting an outage condition at the electrical device or in the section of the electrical distribution system 100 they are monitoring. In some example embodiments, the nodes 104 are powered by the electrical distribution system 100 and have a limited backup power supply, such as capacitors or a battery. When an outage occurs, the nodes 104 have a limited amount of time to output a message indicating the outage before the node 104 itself loses power. The message indicating the outage is output to the network head 102. Outputting a message to the network head 102 means that the message will be output from the node 104 to the network head 102, if the node 104 is in direct communication range of the network head 102, but will follow a path through other nodes 104 until it reaches the network head 102 if the node 104 is not in communication range of the network head 102. The message may be considered a last gasp message. That it, in response to detecting the outage, the node 104 outputs the message indicating the outage status before the node 104 itself runs out of backup power and can no longer communicate messages.

In some example embodiments, the message includes one or more information items. One of the information items may be the outage status of the electrical device or of the section of the electrical distribution system 100 that the node 104 is monitoring. Other information items may be a timestamp and information identifying the node 104.

The nodes 104 along the path to the network head 102 are structured to add their own information items to the message generated by the originating node 104. That is, as a message passes through a node 104, the node 104 may add its own outage status, timestamp, and identifying information to the message before sending the message along to the next node 104 along the path to the network head 102. Each subsequent node 104 may add its own information items to the message. When the message eventually arrives at the network head 102, the message will include the outage status, timestamp, and identifying information added by each node 104 the message has passed through on its way to the network head 102. The message will thus provide the outage status of multiple nodes 104 rather than the outage status of the singular node 104 that generated the message. In addition to the outage status provided by the nodes 104 themselves, the message may be analyzed to glean information about the location and/or extent of an outage of the electrical distribution system 100. For example, if the message takes a circuitous route to the network head 102 when it is known that there are other nodes 104 that provide a shorter route, it provides an indication that the sections of the electrical distribution system 100 monitored by the nodes 104 along the shorter route may be in an outage condition and that the backup power for those nodes 104 has run out.

The message format used to include and convey information from nodes 104 is one that allows the information from one node 104 to be readily added to that from another, the joint information being compressed in a manner that improves the efficiency with which the information from multiple nodes can be more efficiently communicated from the originating node 104 to the network head 102. Adaptive schemes may also be applied by nodes 104 with regard to time delay in sending a message directly to the network head 102, or in forwarding a message to a next hop node 104 so as to allow autonomous adaptation to the message traffic in the network and to maximize the potential for efficient message aggregation.

In some example embodiments, each node 104 that detects an outage status will output the message to the network head 102. Multiple messages will path through the network to the network head 102, with each message having outage status added to it by each node 104 it passes through. The accumulated messages will indicate the outage status of all of the nodes 104 that each message passed through including nodes 104 that may not be in outage status and still operating on mains electrical power, and nodes 104 that are in outage status but operating on backup device power. Additionally, as multiple messages path to the network head 102, the nodes 104 that are unable to receive or pass along messages will become apparent.

In some example embodiments of the disclosed concept, the nodes 104 may be structured to determine the number of times they have added information to messages received from other nodes and determine if that number has exceeded a predetermined threshold. For example, multiple nodes 104 may output last gasp messages around the same time. Multiples of the messages may pass through a selected node 104 on the communication path to the network head 102. Up until the predetermined threshold number of times the selected node 104 has added its own information to the messages, the selected node 104 may add its own outage status or other information items to the messages passing through it. However, these information items may become redundant and unnecessarily add to the amount of data being transmitted over the mesh network. The network head 102 may not necessarily need numerous messages from the selected node 104 indicating its outage status or other information. Thus, when the selected node 104 determines that it has added its own status to the predetermined threshold number of messages, it stops adding its own outage status or other information to the messages passing through it and instead simply passes the messages along to the network head 102 or other nodes 104 on the path to the network head 102. This results in reducing the amount of data being transmitted over the mesh network while providing enhanced outage information or other network status information.

While an outage status is an example of one event that may trigger a node 104 to output the message to the network head 102, it will be appreciated that other types of events may trigger the message to be output. For example, the network head 102 may broadcast a request to the network and nodes 104 may output the message in response to that broadcast. Similarly, the network head 102 may send a request to one or more selected nodes 104 to output the message. As previously noted, the information items included in the original message and added by each subsequent node 104 may be types of information other than an outage status. For example, the network head 102 may request that the nodes 104 output messages including information on one or more characteristics of the electrical distribution system 100 or of the operating or performance status of electrical devices that may be associated with the electrical distribution system 100. In some example embodiments, the event may be power restoration to the node 104 or the electrical device of section of the electrical distribution system 100 monitored by the node 104. In some example embodiments, the event may be an operating status of a controlled electrical device associated with the load. Further, in some example embodiments, the event may be based on characteristics of the electrical device or section of the electrical distribution system 100 monitored by the node 104. For example, a monitored characteristic reaching a threshold level may be the event the triggers the node 104 to output the message.

Figure 2:
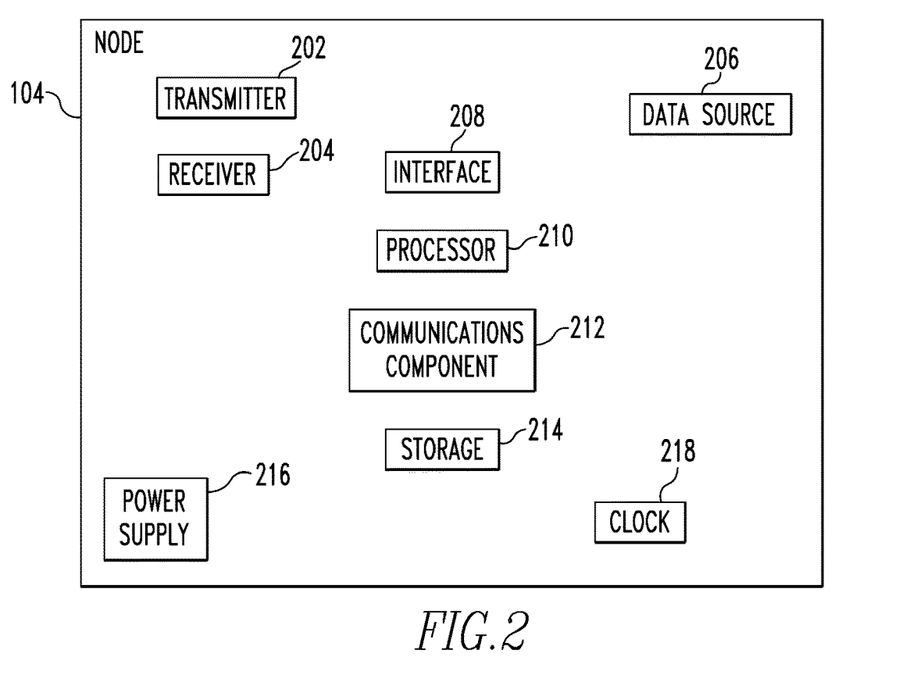
FIG. 2 is a schematic diagram of a node in accordance with an example embodiment of the disclosed concept.

FIG. 2 is a schematic diagram of one node 104 of the mesh network of FIG. 1. The node 104 may be a communication device capable of wireless communication with other nodes 104, the network head 102, or other devices. Persons of ordinary skill in the art will recognize that node 104 is merely one example of a type of communications device that may be employed. In a non-limiting embodiment, the node 104 includes a transmitter 202 and a receiver 204, a data source 206, an interface 208, a processor 210, a communications component 212, a storage component 214, a power supply 216, and at least one clock 218.

One or more of the previously mentioned components may be omitted or combined, and/or one or more additional components may be added. For example, the node 104 may include multiple instances of one or more of the components included therein, however for simplicity, only one of each component has been shown. For example, multiple storage components may be included within the node 104, and each storage may have a different or similar function.

In a non-limiting embodiment, transmitter 202 and receiver 204 can operate alternatively or simultaneously. Data source 206, in one embodiment, is served by transmitter 202 and receiver 204 and provides a variety of functions for the device. For example, data source 206 may be an application processor that interfaces with a utility meter or sensor, or data source 206 may be a utility meter or sensor itself. As another example, data source 206 may be a load control device, an instrument, actuator, and/or a computer system, however these are merely illustrative examples.

Interface 208, in one embodiment, facilitates inputs and outputs of applications and controls data between transmitter 202 and receiver 204 and data source 206. Interface 208 may include digital to analog (D/A) and/or analog to digital (A/D) circuitry. Interface 208 may also include bus circuitry, one or more serial ports (e.g., a USB port), a parallel portion, or any other port or circuitry, or any combination thereof.

Processor(s) 210 includes any processing circuitry, such as one or more processors capable of controlling operations and functionality of the device. In one embodiment, processor(s) 210 facilitates communications between various components within the device. For example, processor 210 may oversee and coordinate functionality of transmitter 202 and receiver 204 and/or control the operation of data source 206. Processor 210, in one exemplary embodiment, runs an operating system of the device, applications resident on the device, firmware applications, media applications, software resident on the device, or any other type of application, or any combination thereof. In one embodiment, processor(s) 210 detects inputs and/or relates detected inputs to one or more actions to be performed on or by the device. For example, processor 210, in one embodiment, communicates with interface 208 such that inputs to interface 208 are recognized and processed accordingly.

In a non-limiting embodiment, processor(s) 210 is capable of determining a facilitation cost associated with sending a given communication to another device. In one embodiment, processor(s) 210 coordinates with storage 214, power supply 216, and communications component 212 in order to ascertain its remaining battery power, the distance of the device from another device using, for instance, a global positioning system, and the amount of power necessary to facilitate the communication to another device. Processor 210 may be further structured to coordinate with clock 218, transmitter 202, and receiver 204 in order to send messages to other devices in the network at specific time intervals.

Communications component 212 includes any circuitry capable of connecting to a communications network, such as a gateway, and/or transmitting communications (e.g., data) to one or more devices and/or servers. Communications component 212 communicates using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quad-band, VOIP, or any other protocol, or any combination thereof.

Storage 214 includes one or more storage mediums. Various types of storage mediums include, but are not limited to, hard-drives, solid state drives, flash memory, permanent memory (e.g., ROM), or any other storage type, or any combination thereof. Any form of data, such as photographs, music, files, videos, applications, and/or documents, is capable of being stored within storage 214. Storage 214, in one embodiment, also corresponds to memory. For example, storage 214 may include cache memory, semi-permanent memory (e.g., RAM), or any other type of memory. In one embodiment, a separate memory component, or separate memory components, are included within the device. In one non-limiting embodiment, storage 214 stores routing information, such as a routing table, for the node 104. The routing table stored by storage 214 includes various other communications devices within a network that communications device 200 is part of. Additionally, the routing table includes, amongst other features, path costs, address, identifiers (e.g., color identifiers), primary gateway devices, and/or auxiliary gateway devices associated with node 104 and/or one or more additional nodes within the network.

Power supply 216 provides electrical power for some or all of the components of the device. Each component, however, may have a different power requirement and power supply 216 is capable of providing an appropriate power supply to each component. Power supply 216 includes, but is not limited to, a battery, power capture circuitry (e.g., a photovoltaic cell), and/or an electrical generator circuit. In some example embodiments, power supply 216 may be or include a backup power supply composed of one or more batteries or capacitors that are structured to provide power when the electrical distribution system no longer provides power to the node 104 (e.g., during an outage).

Clock 218, in one embodiment, includes any form of digital and/or analog clock. Clock 218 is capable of synchronizing with an overall master clock, such as a clock corresponding to a server, however, clock 218 may be programed individually. In one embodiment, clock 218 includes one or more timers or counters that measure a temporal difference between clock 418 of the device depicted in FIG. 2 and another clock located on a separate device. Clock 218 is capable of being precise to the minute, second, millisecond, or nano-second, or any other temporal unit such that differences between clock 218 of the device depicted in FIG. 2 and another clock on a separate device is capable of being determined.

Figure 3:
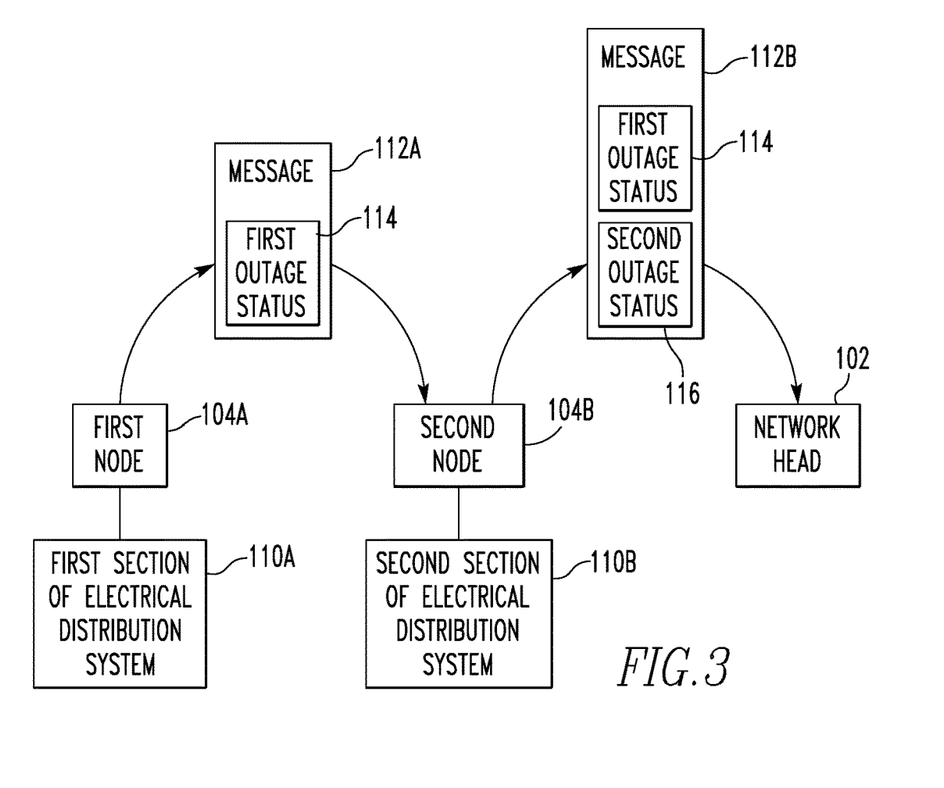
FIG. 3 is a conceptual diagram of a message transmitted between nodes of a mesh network in accordance with an example embodiment of the disclosed concept.

FIG. 3 is a conceptual diagram of a message transmitted between nodes of the mesh network in accordance with an example embodiment of the disclosed concept. In the example shown in FIG. 3, two nodes 104A, 104B of the plurality of nodes of the mesh network are shown. The first node 104A is structured to monitor a first section 110A of the electrical distribution system and the second node 104B is structured to monitor a second section 110B of the electrical distribution system. The second node 104B is on the communication path between the first node 104A and the network head 102.

In response to an event (e.g., an outage in the first section 110A), the first node 104A is structured to wirelessly communication a message 112A to the second node 104B. The message 112A includes a first information item 114. In some example embodiments, the first information item is an outage status associated with the first node 104A. In response to receiving the message 112A, the second node 104B is structured to add a second information item 116 (e.g., an outage status associated with the second node 104B) to the message, generating a second message 112B, that includes the first information item 114 and the second information item 116. The second node 104B is structured to output the second message 112B to the network head 102. It will be appreciated that FIG. 3 illustrates a simplified example. It will be appreciated that multiple other nodes and multiple other types of information, requested or triggered at the node, may be provided without departing from the scope of the disclosed concept.

Figure 4:
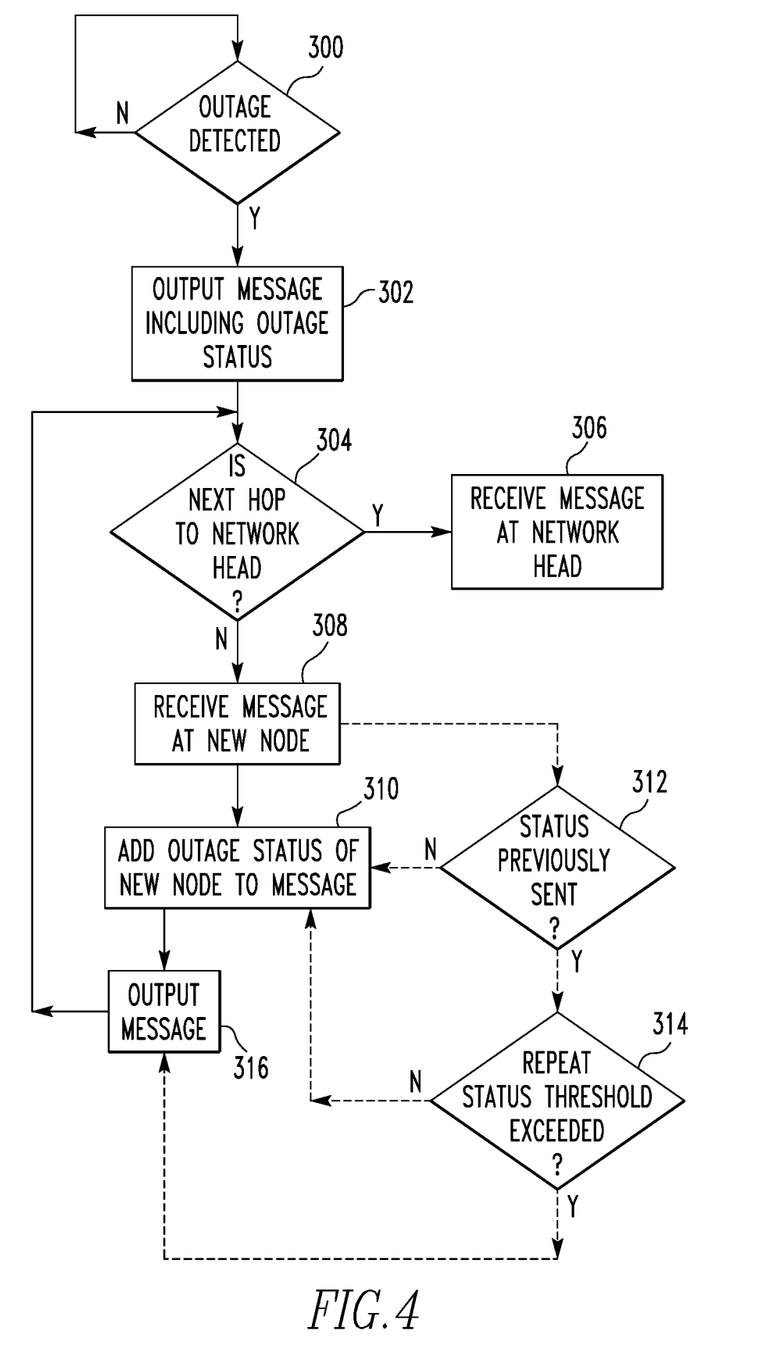
FIG. 4 is a flowchart of a method of communicating an outage in an electrical distribution system in accordance with an example embodiment of the disclosed concept.

FIG. 4 is a flowchart of a method of communication using a mesh network for an electrical distribution system in accordance with an example embodiment of the disclosed concept. The method may be implemented, for example, in the system shown in FIG. 1 or in other suitable mesh networks for electrical distribution systems.

The method begins at 300 with the detection of an outage by, for example, one of the nodes 104. It will be appreciated, though, that events other than an outage may be detected at 300 without departing from the scope of the disclosed concept. It will also be appreciated that information or other status requested rather than detected at 300 may be the initiating event without departing from the scope of the disclosed concept. Once an outage is detected at 300, the method proceeds to 302 where the node 104 outputs a message including an outage status to the network head 102. Outputting the message to the network head 102 may mean outputting the message directly to the network head 102 if the node 104 is in wireless communication range of the network head 102, or wirelessly communicating the message to another node 104 on a communication path to the network head 102. It will also be appreciated that types of information other than the outage status may be including in the message.

At 304, it is determined whether the next hop is the network head 304. If it is, the method proceeds to 306 where the network head 102 receives the message. If not, the method proceeds to 308 where the next node 104 on the communication path to the network head 102 receives the message. At 310, the next node 104 on the communication path adds its own outage status to the message and outputs the message to either the next node 104 or the network head 102.

Optionally, in example embodiments, the nodes 104, upon receiving the message from another node 104, may determine whether they have previously sent their outage status a threshold number of times. For example, after 308, the method may proceed to 312, where the node 104 determines whether it has previously sent its outage status, and, if not, resumes at 310 with the node 104 adding its outage status to the message. If the node 104 has previously sent its outage status, the method proceeds to 314, where the node 104 determines whether it has sent its outage status a threshold number of times. If it has, the node 104 outputs the message without adding its own outage status, and, otherwise proceeds to 310 and adds its outage status to the message.

While the method of FIG. 4 references an outage status, it will be appreciated that other information in addition to or as an alternative to the outage status may be included in and added to messages sent between the nodes 104. Also, while FIG. 4 illustrates one example flowchart of a method of communication in accordance with an example embodiment of the disclosed concept, it will be appreciated that modifications may be made to the flowchart of FIG. 2 without departing from the scope of the disclosed concept.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A mesh network for an electrical distribution system, the mesh network comprising:
    a plurality of nodes each structured to monitor a corresponding electrical device or section of the electrical distribution system; and
    a network head,
    wherein the plurality of nodes includes a first node structured to generate and output a message to the network head in response to an event,
    wherein the message includes at least one first information item associated with the first node, the electrical device monitored by the first node, or the section of the electrical distribution system monitored by the first node,
    wherein the plurality of nodes includes a second node disposed on a communication path between the first node and the network head and being structured to add at least one second information item associated with the second node, the electrical device monitored by the second node, or the section of the electrical distribution system monitored by the second node to the message and to output the message to the network head, and
    wherein the plurality of nodes includes a third node disposed on a communication path between the first node and the network head and, if a number of times the third node added at least one third information item associated with the third node, the electrical device monitored by the third node, or the section of the electrical distribution system monitored by the third node to messages received by the third node from the plurality of nodes is less than a predetermined threshold, to add the at least one third information item to the message and to output the message to the network head, and if the number of times the third node added the at least one third information item to messages received by the third node from the plurality of nodes is greater than or equal to the predetermined threshold, to output the message to the network head without adding the at least one third information item to the message.

2. The mesh network of claim 1, wherein the event is an outage in the electrical device or the section of the electrical distribution system monitored by the first node, wherein the at least one first information item is an outage status of the electrical device or the section of the electrical distribution system monitored by the first node, and wherein the at least one second information item is an outage status of the electrical device or the section of the electrical distribution system monitored by the second node.

3. The mesh network of claim 1, wherein the at least one first information item includes a timestamp or identification information corresponding to the first node, and wherein the at least one second information item includes a timestamp or identification information corresponding to the second node.

4. The mesh network of claim 1, wherein the at least one first information item includes information on one or more characteristics of the electrical device or section of the electrical distribution system monitored by the first node, and wherein the at least one second information item includes information on one or more characteristics of the electrical device or section of the electrical distribution system monitored by the second node.

5. The mesh network of claim 1, wherein the event is a request received by the first node, and wherein the network head is structured to generate and output the request to the first node.

6. The mesh network of claim 5, wherein the network head is structured to generate and output the request to two or more of the plurality of nodes.

7. The mesh network of claim 1, wherein the first node is structured to monitor a first section of the electrical distribution system corresponding to a first branch of the electrical distribution system, and wherein the second node is structured to monitor a second section of the electrical distribution system corresponding to a second branch of the electrical distribution system, wherein the first branch and the second branch are different.

8. The mesh network of claim 1, wherein the first node is structured to be powered by the electrical distribution system, wherein the first node includes a backup power supply, and wherein the first node is structured to use power from the backup power supply to output the message to the network head.

9. The mesh network of claim 8, wherein the backup power supply includes one or more of a battery and a capacitor.

10. The mesh network of claim 1, wherein the event is restoration of power to the second of the electrical distribution system monitored by the first node, an operating status of the electrical device monitored by the node, or is based on one or more characteristics of the electrical device or the section of the electrical distribution system monitored by the node.

11. The mesh network of claim 1, wherein the second node is structured to compress the message information before outputting the message to the network head.

12. A method of communication using a mesh network for an electrical distribution system, the method comprising:
    generating a message with a first node of the mesh network in response to an event and outputting the message to a network head of the mesh network, wherein the message includes at least one first information item associated with the first node, an electrical device monitored by the first node, or a section of the electrical distribution system monitored by the first node;
    receiving the message with a second node of the mesh network disposed on a communication path between the first node and the network head;

adding at least one second information item associated with the second node, an electrical device monitored by the second node, or a section of the electrical distribution system monitored by the second node to the message and outputting the message from the second node to the network head;

receiving the message with a third node disposed on the communication path between the first node and the network head;

determining if a number of times the third node added at least one third information item associated with the third node, the electrical device monitored by the third node, or the section of the electrical distribution system monitored by the third node to messages received by the third node from the plurality of nodes is less than a predetermined threshold;

adding the at least one third information item to the message and outputting the message to the network head if the number of the number of times the third node added the at least one third information item to messages received by the third node from the plurality of nodes is less than the predetermined threshold; and outputting the message to the network head without adding the at least one third information item to the message if the number of times the third node added the at least one third information item to messages received by the third node from the plurality of nodes is greater than or equal to the predetermined threshold.

13. The method of claim 12, wherein the event is an outage in the electrical device or the section of the electrical distribution system monitored by the first node, and wherein the at least one first information is an outage status of the electrical device or the section of the electrical distribution system monitored by the first node and wherein the at least one second information item is an outage status of the electrical device or the section of the electrical distribution system monitored by the second node.

14. The method of claim 12, wherein the at least one first information item includes a timestamp or identification information corresponding to the first node, and wherein the at least one second information item includes a timestamp or identification information corresponding to the second node.

15. The method of claim 12, wherein the event is a request received by the first node, wherein the method further comprises:

generating the request with the network head and outputting the request to the first node.

16. The method of claim 15, further comprising:

outputting the request to two or more of the plurality of nodes.

17. The method of claim 12, wherein the first node is structured to be powered by the electrical distribution system, wherein the first node includes a backup power supply, and wherein the first node is structured to use power from the backup power supply to output the message to the network head.

18. A mesh network for an electrical distribution system, the mesh network comprising:

a plurality of nodes each being structured to wirelessly communicate with at least one other of the plurality of nodes; and a network head being structured to wirelessly communicate with at least one of the plurality of nodes, wherein the plurality of nodes includes a first node structured to generate and wirelessly communicate a first message to a second node of the plurality of nodes, the first message including a first information item associated with the first node, wherein the second node is structured to generate and wirelessly communicate a second message to a third node of the plurality of nodes, the second message including the first information item associated with the first node and a second information item associated with the second node, and wherein, if a number of times the third node generated a third message including a third information item associated with the third node is less than a predetermined threshold, to generate the third message including the first, second, and third information items and to output the third message to the network head, and if the number of times the third node generated the third message including the third information item associated with the third node is greater than or equal to the predetermined threshold, to generate the third message with the first and second information items and without the third information item and to output the third message to the network head.

* * * * *